United States Patent [19]

Servel et al.

[11] Patent Number: 4,713,804

[45] Date of Patent: Dec. 15, 1987

[54] METHOD AND DEVICE FOR CONVERTING DIGITAL CHANNEL MULTIFRAMES INTO PACKET MULTIFRAMES

[76] Inventors: Michel Servel, Le Rhu Servel, 22300 Lannion; Alain Thomas, 2, rue du Bal Landreau, 44400 Reze-les-Nantes, both of France

[21] Appl. No.: 881,681

[22] Filed: Jul. 3, 1986

[30] Foreign Application Priority Data

Jul. 3, 1985 [FR] France .................. 85 10180

[51] Int. Cl.$^4$ ............................................. H04Q 11/04
[52] U.S. Cl. .......................................... 370/68; 370/66
[58] Field of Search ..................... 370/68, 66, 94, 60

[56] References Cited

U.S. PATENT DOCUMENTS

3,832,492  8/1974  Charransol et al. .............. 370/68
4,272,844  6/1981  Roche et al. ..................... 370/66
4,402,078  8/1983  Athenes et al. .................. 370/66

Primary Examiner—Douglas W. Olms
Assistant Examiner—Melvin Marcelo
Attorney, Agent, or Firm—Lowe, Price, Leblanc, Becker & Shur

[57] ABSTRACT

The method consists in converting an inputting multiframe including of M frames each having words assigned respectively to C multiplexed digital channels into an outgoing multiframe including of C packets each having M words of a respective channel. So as to only use a single memory, a word having a given rank in the outgoing multiframe and a word having said given rank in the inputting multiframe are read and written consecutively in a same cell of the single memory. The memory has a capacity at least equal to MC word cells. The MC cells are addressed according to an address order rebecoming identical to itself after a cycle of N multiframe periods, where N is the smallest integer so that $C^N \equiv 1 \pmod{(MC-1)}$.

8 Claims, 8 Drawing Figures

FIG. 5

METHOD AND DEVICE FOR CONVERTING DIGITAL CHANNEL MULTIFRAMES INTO PACKET MULTIFRAMES

BACKGROUND OF THE INVENTION

1. Field of the Invention

The present invention relates, generally speaking, to an adaptation of frame structures between an inputting digital path and an outgoing digital path carrying frames having different configurations.

More especially, the invention deals with a method designed to convert an inputting multiframe having of M frames each including words having a predetermined number of digits and assigned respectively to C multiplexed digital channels, into an outgoing multiframe having C packets assigned respectively to the channels and each including M successive words of the respective channel, where M and C are integers.

2. Description of the Prior Art

So as not to loose information during such conversion, two RAM type memories can be used in parallel. Each of the RAM memories has a capacity of MC word cells. One of the memories operates on write whereas the other memory operates on read alternating a period over two multiframe periods. Thus, in each of the memories, an inputting path multiframe is fully written during a first multiframe period, then an outgoing multiframe is fully read during a second multiframe period succeeding to the first period.

OBJECTS OF THE INVENTION

The main object of this invention is to provide multiframe conversion via one single memory having a capacity of MC word cells.

Another object of this invention is to suppress one of the two memories according to the previous prior art, so as to reduce the costs of the multiframe conversion.

SUMMARY OF THE INVENTION

Accordingly, a multiframe conversion method is so that a word having a given rank and to be included in the outgoing multiframe and a word having the same given rank and included in the inputting multiframe are read and written consecutively in a same cell of the MC-word cell single memory. The MC cells of the memory are addressed according to an address order rebecoming identical to itself after a cycle of N multiframe periods, where N is the lowest integer such that $C^N \equiv 1 \pmod{(MC-1)}$.

Preferably, the memory cells are successively addressed according to the addresses $0, a_1$ so that $C^{n-1} \equiv a_1 \pmod{(MC-1)}$, $a_2$ so that $2C^{n-1} \equiv a_2 \pmod{(MC-1)}$, $a_3$ so that $3C^{n-1} \equiv a_3 \pmod{(MC-1)}$, ... $a_{(MC-2)}$ so that $(MC-2)C^{n-1} \equiv a_{(MC-2)} \pmod{(MC-1)}$, and $(MC-1)$ during a nth multiframe period of the cycle, where n is an integer laying between 1 and N.

A multiframe converting device embodying this invention comprises a memory receiving inputting multiframes and transmitting outgoing multiframes, the memory having at least MC word cells, means for counting the words in each of said inputting multiframes thereby successively supplying binary-coded numbers 0 to $(MC-1)$ during each of multiframe periods, the binary-coded numbers 0 to $(MC-1)$ forming a first address sequence of the memory cells for a first multiframe period of the N-multiframe period cycle, and means for converting the first sequence of the binary-coded numbers 0 to $(MC-1)$ into N memory cell address sequences specific respectively to the cycle multiframe periods.

In particular the counting means comprises a modulo-MC counter synchronized with and counting the words in each of the inputting multiframes for supplying the first sequence of binary-coded numbers 0 to $(MC-1)$ corresponding to the memory cell addresses during the first multiframe period of the cycle, and the converting means comprises a modulo-N counter incremented responsive to resets of the modulo-MC counter for deriving signals respectively identifying the N multiframe periods of the cycle, and memory cell addressing means for deriving N memory cell address sequences $0, a_1, a_2, a_3, \ldots a_{(MC-2)}$, $(MC-1)$ in terms of the first sequence of binary-coded numbers 0 to $(MC-1)$ and responsive to the N multiframe period identifying signals respectively.

According to a preferred embodiment corresponding to multiframe structures most currently employed, the number C of channels is a power of 2, such as $2^x$, where x is an integer, which obtains addressing means with a low number of relatively simple electronic components. In this case, a memory cell address in binary code having a given rank during a nth multiframe period of the cycle is deduced from a first memory cell address in binary code having said given rank during the first multiframe period of the cycle, by shifting the bits in the first address by $x(n-1)$ bit ranks from the last significant bit rank of said first address. The invention thus provides for two types of multiframe converting device embodying this preferred embodiment.

In a first converting device, the addressing means comprises K multiplexers controlled by the modulo-N counter, where K is an integer equal to a maximum number of bits in the memory cell addresses and to a maximum number of bits in the binary-coded numbers 0 to $(MC-1)$. Each multiplexer has N inputs and one output delivering one bit having a given rank in each of the cell memory. The N inputs of a kth multiplexer, where k is an integer laying between 1 and K, are connected respectively to K outputs of the modulo-MC counter supplying the bits of the binary-coded numbers 0 to $(MC-1)$ having respectively rank $R_0$ so that $R_0=k$, rank $R_1$ so that $(k-1)+(K-x) \equiv R_1-1 \pmod K$, rank $R_2$ so that $(k-1)+(K-x)2 \equiv R_2-1 \pmod K$, . . . and rank $R_{N-1}$ so that $(k-1)+(K-x)(N-1) \equiv R_{N-1}-1 \pmod K$, the ranks being counted from 1 to K as from a least significant bit of binary-coded numbers 0 to $(MC-1)$. The outputs of the multiplexers are connected selectively to the inputs of the multiplexers receiving the respective bits of ranks $R_{N-1}$ in response to the signal identifying the nth multiframe period of the cycle, where n is an integer laying between 1 and N.

In a second converting device, the addressing means comprises N transfer gate means controlled by the modulo-N counter. Each of the transfer gate means has K inputs and K outputs, where K is an integer equal to a maximum number of bits of the memory cell addresses and to a maximum number of bits of the binary-coded numbers 0 to $(MC-1)$. The K outputs of one transfer gate means are connectable respectively to the K inputs of this gate means and deliver K parallel memory cell address bits. The K inputs of a nth transfer gate means, where n is an integer laying between 1 and N, are connected respectively to K outputs of the modulo-MC counter supplying the bits of the binary-coded numbers 0 to (MC−1) having respectively rank $R_0$ so that $0+(K-x)(n-1) \equiv R_0-1 \pmod{K}$, rank $R_1$ so that $1+(K-x)(n-1) \equiv R_1-1 \pmod{K}$, rank $R_2$ so that $2+(K-x)(n-1) \equiv R_2-1 \pmod{K}$, ... rank $R_{K-1}$ so that $(K-1)+(K-x)(n-1) \equiv R_{K-1}-1 \pmod{K}$. The inputs and outputs of the nth transfer gate means are respectively connected to supply a sequence of MC addresses in response to the signal identifying the nth multiframe period of the cycle.

BRIEF DESCRIPTION OF THE DRAWING

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

So as to better understand the method embodying the invention, it is described in detail hereinafter, referring to simple numerical values according to a first embodiment.

Figure 1A:
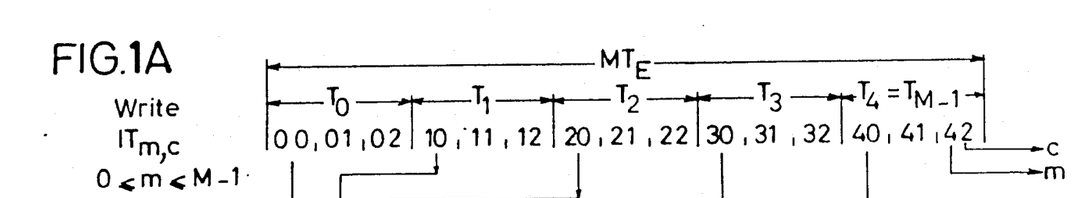
FIGS. 1A and 1B show respectively structures of an inputting multiframe and an outgoing multiframe according to a first embodiment in which C=3 and M=5.

According to the first embodiment, an inputting digital path E carries C=3 time-division multiplexed PCM channels, as shown in FIG. 1A. A frame T of the inputting digital path contains C=3 time intervals assigned respectively to the channels. A PCM channel word with a predetermined number of digits, such as 8 or 10 bits, is included in each time interval.

Figure 1B:
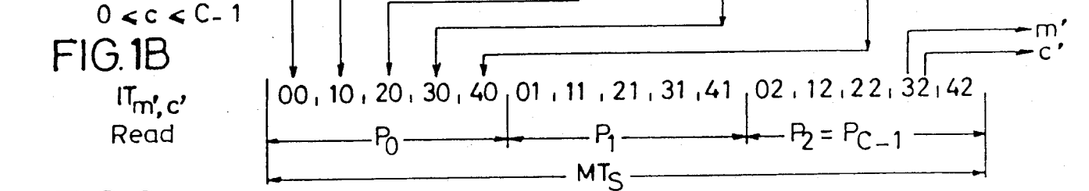

For this first embodiment it is assumed that M=5 successive words in one channel and contained in time intervals having the same rank in M=5 successive frames $T_0$ to $T_{M-1}=T_4$ of path E are to be grouped into a packet forming an outgoing elementary frame, in an outgoing digital path S. The outgoing path carries a multiframe $MT_S$ consisting of C=3 packets $P_0$ to $P_{C-1}=P_2$, as shown in FIG. 1B, resulting from a conversion of the multiframe $MT_E$ of the inputting path having M=5 frames $T_0$ to $T_{M-1}=T_4$, as shown in FIG. 1A. If we denote by $IT_{m,c}$ the content or word of a time interval assigned to the c rank PCM channel in a frame $T_m$ of the inputting multiframe $MT_E$, where c is an integer varying from 0 to C−1=2 and m is an integer varying from 0 to M−1=4, it appears that the words $IT_{0,c}$ to $IT_{m-1,c}$ of the c rank PCM channel are grouped respectively in the outgoing multiframe $MT_S$ to form a packet $P_c$ and that the words $IT_{0,c}$ to $IT_{m,C-1}$ in frame $T_m$ are stored respectively in time intervals $IT_{m',0}$ to $IT_{m',C-1}$ of rank m=m' in the packets $P_0$ to $P_{C-1}$ of the outgoing multiframe $MT_S$. $IT_{m',c'}$ denotes the content or word of a time interval assigned to the rank m' word of a packet $P_{c'}$ of the c=c' rank channel, where m' and c' are integers varying respectively from 0 to m−1=4 and from 0 to C−1=2.

The invention consists in converting the inputting multiframe $MT_E$ into the outgoing multiframe $MT_S$ via a single RAM type memory 1, having a minimum capacity of M×C=5×3=15 word cells. More precisely, the multiframe conversion consists, during first multiframe period $t_0$, in reading in a predetermined memory cell a word $IT_{m',c'}$ to be included in an outgoing multiframe and consecutively writing in the predetermined cell and ath word $IT_{m,c}$ of the inputting multiframe succeeding to the abovementioned outgoing multiframe, where a is an integer varying from 0 to (MC−1)=14 and designating the address of the predetermined memory cell so that $a=m'+c'M=c+mC$.

Figure 2:
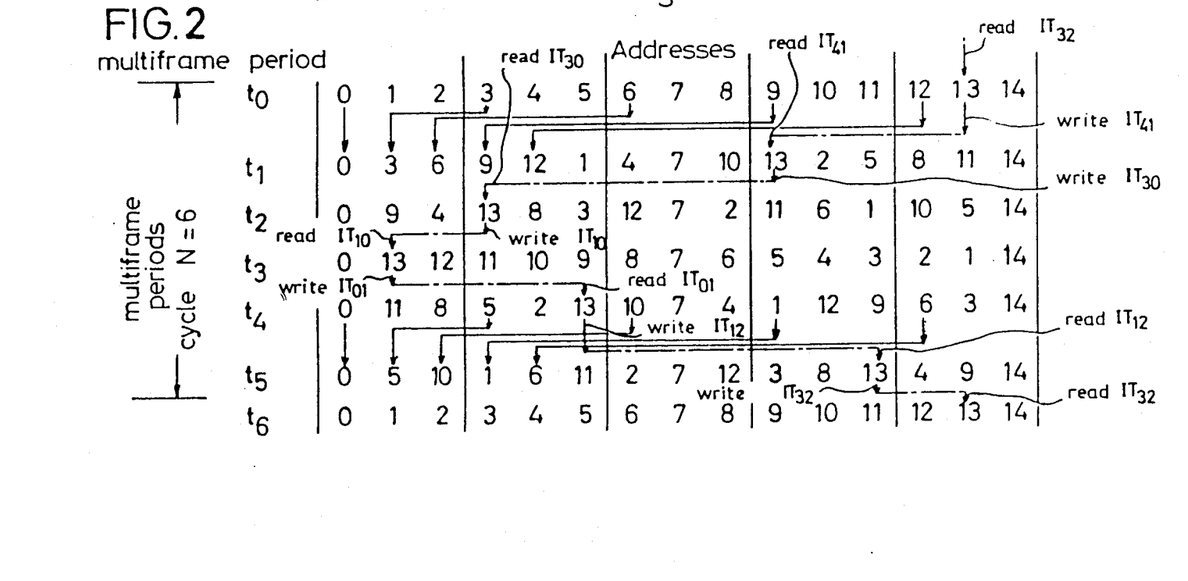
FIG. 2 is a table of a memory cell addresses for a cycle of N=6 multiframe periods according to the first embodiment.

Referring to FIGS. 1A, 1B and 2, for example, when the word $IT_{m',c'}=IT_{3,2}$ to be included in the outgoing multiframe during the period $t_0$ is read in the memory cell with address 3+2×5=13, the word $IT_{m,c}=IT_{4,1}$ having indexes so that 1+4×3=13, is written in the cell with address 13. During a multiframe period $t_1$ succeeding to period $t_0$, the cell having address a=13 is the 10th cell read as from the start of the period $t_1$ so that the word $IT_{4,1}$ written in this cell during the preceding period $t_0$ is included in the 10th corresponding time interval in a second outgoing multiframe; simultaneously, the 10th word $IT_{3,0}$ of an inputting multiframe arriving during the period $t_1$ is written in the cell having address a=13. During a multiframe period $t_2$ succeeding to period $t_1$, the address cell a=13 is the 4th cell read so that the word $IT_{3,0}$ written in this cell during the preceding period $t_1$ is included in the 4th corresponding time interval in a third outgoing multiframe; simultaneously, the 4th word $IT_{1,0}$ of an inputting multiframe arriving during the period $t_2$ is written in the address cell a=13. The read rank of the address cell a=13 is deduced in a similar way during the following multiframe periods $t_3$, $t_4$, $t_5$ and $t_6$ until the read rank of the address cell a=13 again becomes equal to 13, corresponding to the 6th multiframe period $t_6$ succeeding to period $t_0$ according to this first embodiment. A cycle of N=6 multiframe periods is therefore required to reobtain a same memory address order.

The order of addresses of the 15 cells of the memory for each of the multiframe periods $t_0$ to $t_6$ deduced for each cell in a similar way to the example described above, is indicated in the table in FIG. 2. It appears that the conversion of an inputting multiframe into an outgoing multiframe during a multiframe period results in a grouping of words written into a packet $P_c$ obtained by reading the cells having memorized inputting words of the same rank c in the frames $T_0$ to $T_432$ $T_{M-1}$ of the inputting multiframe previously written, i.e., from C=3 to C=3. Thus the addressing order, or address sequence, of the cells during the period $t_1$ is deduced from the addressing order, or address sequence, of the cells during the period $t_0$, selecting from 3 to 3 the addreses 0, 3, 6, 9 and 12 from addresses 0 to form packet $P_0$ of the first channel, selecting from 3 to 3 the addresses 1, 4, 7, 10 and 13 from address 1 to form packet $P_1$ of the second channel and selecting from 3 to 3 the addresses 2, 5, 8, 11 and 14 from address 2 to form packet $P_2$ of the third channel. In the same way the cell addressing order during the periods $t_2$, $t_3$, $t_4$ and $t_5$ of a cycle is deduced from the cell addressing order during the previous periods $t_1$, $t_2$, $t_3$ and $t_4$ respectively, selecting from C=3 to C=3 the addresses during the respective previous periods.

As compared to the order of addresses during the first period $t_0$ of the cycle having N=6 multiframe periods, the selection of addresses is therefore made from C=3 to C=3 for the period $t_1$, from $C^2=9$ to $C^2=9$ for the period $t_2$, from $C^3=27$ to $C^3=27$ for the period $t_3$, from $C^4=81$ to $C^4=81$ for the period $t_4$ and from $C^5=243$ to $C^5=243$ for the period $t_5$. In other words, addresses $r_1$, $r_2$, $r_3$, $r_4$ and $r_5$ of the cells read at a same rank $r_0$ in the multiframe periods $t_1$, $t_2$, $t_3$, $t_4$ and $t_5$ as the address $r_0$ in multiframe period $t_0$, with $0 < r_0 < MC-1$, are deduced respectively from the relations $r_0 C \equiv r_1 \pmod{(MC-1)}$, $r_0 C^2 \equiv r_2 \pmod{(MC-1)}$, $r_0 C^3 \equiv r_3 \pmod{(MC-1)}$, $r_0 C^4 \equiv r_4 \pmod{(MC-1)}$, and $r_0 C^5 \equiv r_5 \pmod{(MC-1)}$. The address 0 and address 14 are always the first address and last address in all the multiframe periods $t_0$ to $t_5$.

Selections of previous addresses can also be deduced from the relations indicating the addresses of the cells read successively at the nth multiframe period of the cycle depending on addresses 1 to (MC−1)=14 of the cells read sucessively in the first multiframe period $t_0$; for example, for the nth=5th multiframe period $t_{n-1}=t_4$, the successive addresses are $a_0=0$, $a_1=11$ such as $3^4 \equiv a_1 \pmod{14}$, $a_2=8$ such as $2.3^4 \equiv a_2 \pmod{14}$, $a_3=5$ such as $3.3^4 \equiv a_3 \pmod{14}$, ... $a_{13}=3$ such as $13.3^4 \equiv a_{13} \pmod{14}$, and $a_{14}=14$.

Moreover the number N of multiframes per cycle is defined when, as already stated, during a multiframe period $t_N=t_6$, succeding period $t_0$, the address $r_0$ is read at the same rank as for period $t_0$, which results in the relation:

$$r_0 C^N \equiv r_0 \pmod{(MC-1)},$$

i.e., the smallest integer N so that:

$$C^N \equiv 1 \pmod{(MC-1)}.$$

Figure 3A:
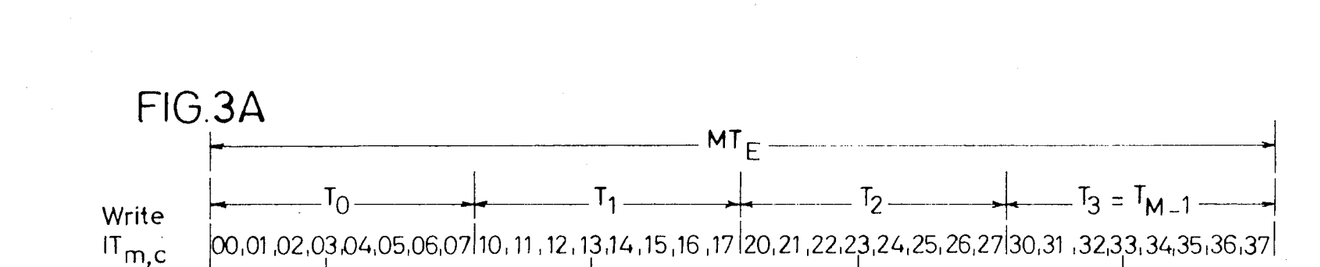
FIGS. 3A and 3B show respectively structures of an inputting multiframe and an outgoing multiframe according to a second embodiment in which C=$2^3$=8 and M=$2^2$=4.
Figure 3B:
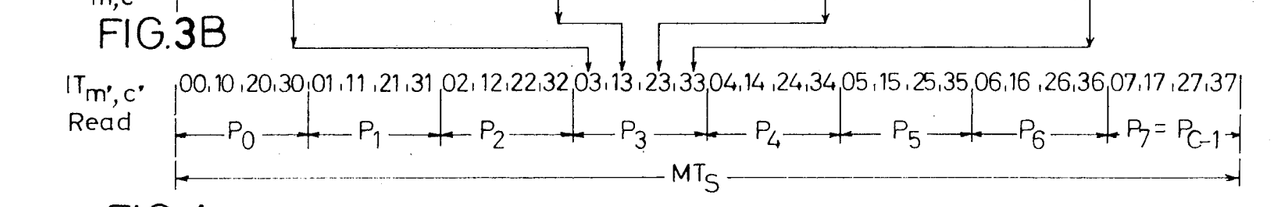
Figure 4:
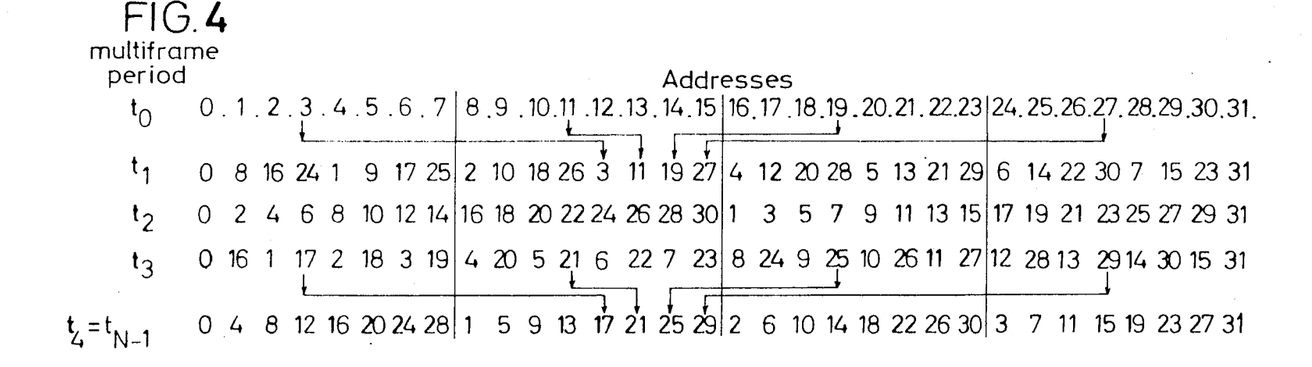
FIG. 4 is a table of a memory cell addresses for a cycle of N=5 multiframe periods according to the second embodiment.

A table in FIG. 4 indicates the order of addresses during successive multiframe periods corresponding to a second and more practical embodiment in which the numbers C and M are powers of 2. According to this second embodiment, an inputting multiframe $MT_E$ shown in FIG. 3A consists of M=4 frames $T_0$ to $T_3$ each containing C=8 multiplexed digital channel words, and an outgoing multiframe $MT_S$ shown in FIG. 3B consists of C=8 packets $P_0$ to $P_7$ each grouping M=4 successive words of the same channel. From previous relations it is deduced that a cycle includes N=5 multiframes given that the integer 5 is the smallest integer N satisfying the relation $$8^N \equiv 1 \pmod{(32-1)}.$$

Figure 5:
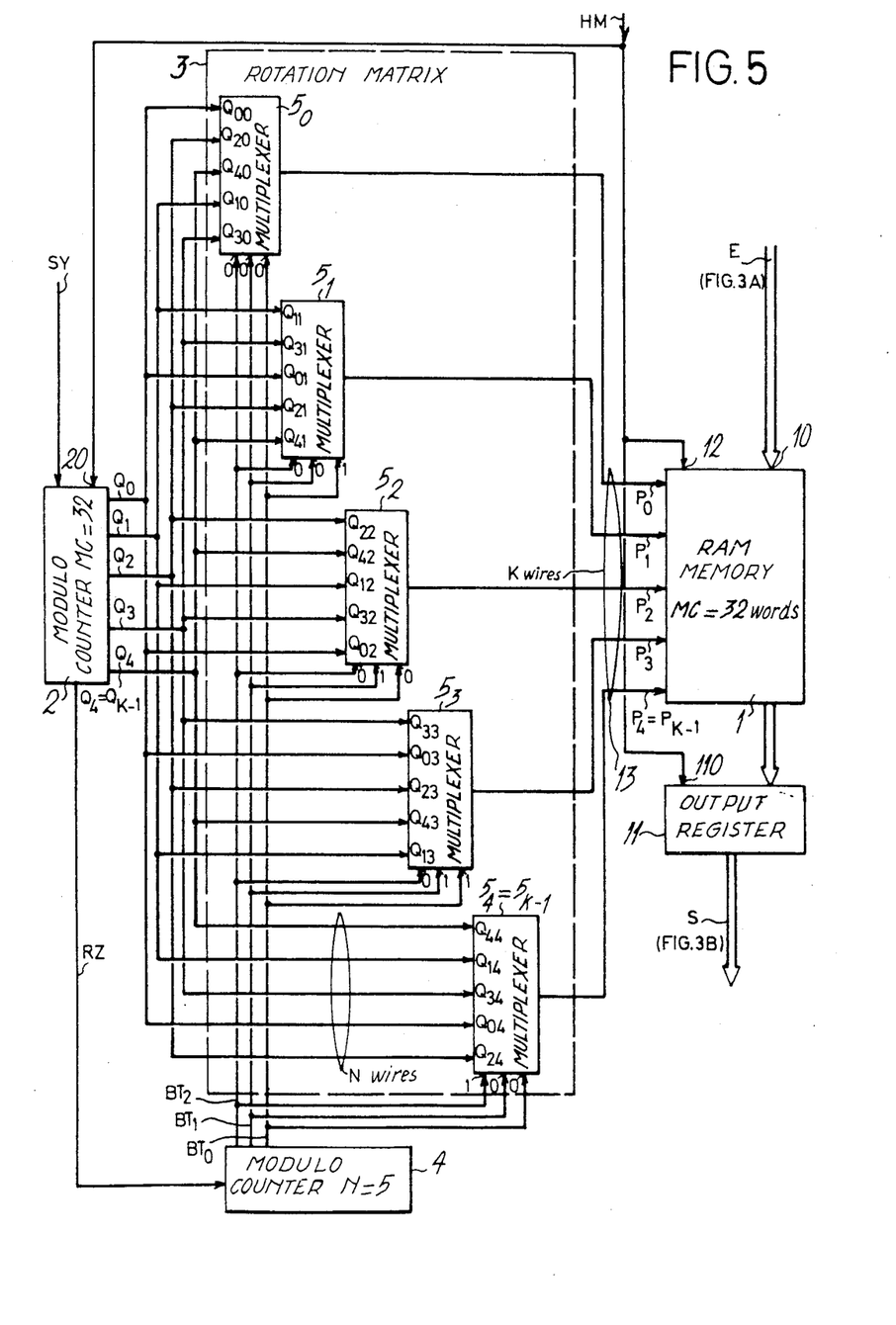
FIG. 5 is a block diagram of a first converting device according to the second embodiment.

The addresses for the multiframe periods $t_1$ to $t_{N-1}=t_4$ are also deduced from the congruence relations indicated above. For example the fourth addresses $r_1$ to $r_4$ in the multiframe periods $t_1$ to $t_4$ are deduced from the following relations:

$3.8 \equiv r_1 \pmod{31}$, i.e. $r_1=24$ $3.8^2 \equiv r_2 \pmod{31}$, i.e. $r_2=6$ $3.8^3 \equiv r_3 \pmod{31}$, i.e. $r_3=17$ $3.8^4 \equiv r_4 \pmod{31}$, i.e. $r_4=12$ Now referring to FIG. 5, a converting device embodying the invention includes RAM memory 1 having a minimum capacity equal to MC words. Memory 1 receives via parallel inputs 10 the serialized words $IT_{m,c}$ with parallel bits from the inputting path E and transmits, through an one-word output register 11, the serialized words $IT_{m',c'}$ with parallel bits to the outgoing path S. Moreover, the converting device receives an clock signal HM at the frequency of the inputting words. Signal HM is derived by a conventional clock recovering and possibly transcoding circuit (not shown) upline from inputs 10. The signal HM is applied to a read/write authorization input 12 in a memory 1, to a transfer order input 110 of register 11 as well as to a clock input 20 of a counter 2. Counter 2 included in the converting device is a MC modulo counter which is incremented by one unit on each HM signal pulse and which is synchronized with the inputting frames by means of a synchronization signal SY. Signal SY is delivered by the clock recovering circuit already referred to and is obtained for example by a detection of a specific word in inputting path E, such as a frame or a multiframe alignment word specific to the time-division multiplexing of the PCM channels.

In the second practical embodiment in which $M=2^2=4$ and $C=2^3=8$ and MC=32, the addresses of the 32 cells of the memory 1 are words having $K=\log_2 MC=5$ bits. A 5-wire output bus $Q_0$, $Q_1$, $Q_2$, $Q_3$ and $Q_4$ of counter 2 supplies, at the frequency of the word clock signal HM, the addresses 0 to MC−1=31. Hereinafter, $Q_0$ to $Q_4$ also denote the bits of an address word, $Q_0$ and $Q_4$ being the least and most significant bits of the address word.

The converting device also comprises means 3-4 for converting the natural order of addresses 0 to MC−1=31 corresponding to the first multiframe period $t_0$ of a cycle into an order of addresses specific to each of the multiframe periods $t_1$ to $t_4=t_{N-1}$, according to the table in FIG. 4. Knowing that a cell address having bits $P_4 P_3 P_2 P_1 P_0$, and a given rank in the sequence of addresses for a multiframe period $t_1$ to $t_4=t_{N-1}$ is deduced from the bit cell address having bits $A_4 A_3 A_2 A_1 A_0$ and said given rank in the sequence of the addresses in the multiframe period $t_0$ to $t_3$ preceding the period $t_1$ to $t_4$ by a multiplication by $C=2^x=2^3=8$ modulo $(2^5-1=31)$ i.e., modulo a power of 2 above $2^3$, multiplication by 8 implies that the address $P_4 P_3 P_2 P_1 P_0$ is deduced from address $A_4 A_3 A_2 A_1 A_0$ by a shift of x=3 bit ranks of this address from the rank of the least significant bit $A_0$. In other words, the bits $P_0$, $P_1$, $P_2$, $P_3$ and $P_4$ are respectively equal to $A_3$, $A_4$, $A_0$, $A_1$ and $A_2$. For example the address 14 having the rank 8 for the period $t_2$ according to the table in FIG. 4 is deduced from the address 25 having the rank 8 for the period $t_1$, according to the following relations:

(address 25)=$P_4 P_3 P_2 P_1 P_0$=11001 and whence
$A_3=P_0=1$
$A_4=P_1=0$
$A_0=P_2=0$
$A_1=P_3=1$ $A_2 = P_4 = 1$
i.e., (address 14)=$A_4 A_3 A_2 A_1 A_0$=01110.

In relation to an address $Q_4 Q_3 Q_2 Q_1 Q_0$ having a given rank for the period $t_0$, the addresses having the same rank for the multiframe periods $t_1$, $t_2$, $t_3$ and $t_4$ of a cycle are deduced from it by circular shifts or permutations of bits from the rank of the least significant bit, respectively equal to $3 \times 1 = 3$, $3 \times 2 = 6$, $3 \times 3 = 9$ and $3 \times 4 = 12$, and indicated in the following table I:

TABLE I

| address | multiframe period | | | | |
|---|---|---|---|---|---|
| | $t_0$ | $t_1$ | $t_2$ | $t_3$ | $t_4 = t_{N-1}$ |
| $P_0$ | $Q_0$ | $Q_2$ | $Q_4$ | $Q_1$ | $Q_3$ |
| $P_1$ | $Q_1$ | $Q_3$ | $Q_0$ | $Q_2$ | $Q_4$ |
| $P_2$ | $Q_2$ | $Q_4$ | $Q_1$ | $Q_3$ | $Q_0$ |
| $P_3$ | $Q_3$ | $Q_0$ | $Q_2$ | $Q_4$ | $Q_1$ |
| $P_4 = P_{K-1}$ | $Q_4$ | $Q_1$ | $Q_3$ | $Q_0$ | $Q_2$ |

For example, still referring to rank 8 according to the table in FIG. 4, we obtain according to table I:

| | $t_0$ | $t_1$ | $t_2$ | $t_3$ | $t_4 = t_{N-1}$ |
|---|---|---|---|---|---|
| address in decimal code | 7 | 25 | 14 | 19 | 28 |
| (least significant) | 1 | 1 | 0 | 1 | 0 |
| | 1 | 0 | 1 | 1 | 0 |
| address in binary code | 1 | 0 | 1 | 0 | 1 |
| | 0 | 1 | 1 | 0 | 1 |
| (most significant) | 0 | 1 | 0 | 1 | 1 |

As shown in FIG. 5, means 3-4 for obtaining the permutations of bits $Q_0$ to $Q_4$ according to table I are in the form of a rotation matrix 3 and a counter 4.

The rotation matrix 3 consists of $K=5$ parallel multiplexers $5_0$ to $5_4$ each having $N=5$ inputs and one output $P_0$ to $P_4$. $N=5$ inputs of each of multiplexers $5_0$ to $5_4$ are connected to the outputs $Q_0$ to $Q_4$ of address counter 2 corresponding with a respective row in table I. Thus first, second, third, fourth and fifth inputs $Q_{00}$, $Q_{20}$, $Q_{40}$, $Q_{10}$ and $Q_{30}$ of the first multiplexer $5_0$ are connected to outputs $Q_0$, $Q_2$, $Q_4$, $Q_1$ and $Q_3$ of counter 2 respectively. First, second, third, fourth and fifth inputs $Q_{11}$, $Q_{31}$, $Q_{01}$, $Q_{21}$ and $Q_{41}$ of the second multiplexer $5_1$ are connected to outputs $Q_1$, $Q_3$, $Q_0$ and $Q_4$ of counter 2 respectively. The connections of the $N=5$ inputs of the other multiplexers $5_2$, $5_3$ $5_4$ with the outputs of counter 2 are deduced in a similar fashion, corresponding with third, fourth and fifth ranks of bits in table I. If the ranks of bits of the numbers in binary code 0 to $(MC-1)=31$ outputting from counter 2 are designated by $R_0$ to $R_{K-1}$ and applied respectively to the first, second, third, . . . and Nth inputs of any multiplexer, such as inputs $Q_{33}$, $Q_{03}$, $Q_{23}$, $Q_{43}$ and $Q_{13}$ of the kth=4th multiplexer $5_3$, the bits of numbers 0 to $(MC-1)$ applied respectively to these inputs are then bit $Q_3$ having rank $R_0$ so that $R_0=k=4$, bits $Q_0$ having rank $R_1$ so that $(k-1)+(K-x) \equiv (R_1-1)$ (mod K), i.e., $R_1=1$, bit $Q_2$ having rank $R_2$ so that $(k-1)+(K-x)2 \equiv (R_2-1)$ (mod K), i.e., $R_2=3$, bit $Q_4$ having rank $R_3$ so that $(k-1)+(K-x)3 \equiv (R_3-1)$ (mod K), i.e., $R_3=5$, and bit $Q_1$ having rank $R_4$ so that $(k-1)+(K-x)4 \equiv (R_4-1)$ (mod K), i.e., $R_4=2$.

Outputs $P_0$ to $P_4$ of multiplexers $5_0$ to $5_4$ are connected to a $K=5$-wires addressing bus 13 of memory 1.

Counter 4 is a modulo N counter which is incremented by one unit via an output wire RZ of counter 2 whenever counter 2 is reset, i.e., after the count of counter 2 has reached $MC-1=31$. Thus, counter 4 counts the multiframe periods of a cycle, and its count returns to zero at the end of each cycle of $N=5$ multiframe periods; Each multiframe period $t_0$ to $t_4$ is marked by the corresponding number 0 to 4 in binary code in a 3-wire output bus $BT_0$, $BT_1$ and $BT_2$ of counter 4. Wires $BT_0$ to $BT_2$ are connected to three terminals selecting inputs of each of the multiplexers $5_0$ to $5_4$. Thus, as soon as the count of counter 4 is equal to 0, the number 000 of multiframe $t_0$ on wires $BT_0$, $BT_1$ and $BT_2$ causes selection of the first inputs $Q_{00}$, $Q_{11}$, $Q_{22}$, $Q_{33}$ and $Q_{44}$ in multiplexers $5_0$ to $5_4$ to connect respectively outputs $Q_0$ to $Q_4$ of address counter 2 to outputs $P_0$ to $P_4$ of the multiplexers throughout the first multiframe period $t_0$ of a cycle and thus to address memory 1 by the address words consisting of bits having ranks $R_0$ to $R_4$ equal to 1, 2, 3, 4 and 5, as defined above. Then, as soon as the count of the counter 4 is equal to 1, the number 001 of multiframe period $t_1$ on wires $BT_0$, $BT_1$ and $BT_2$, causes selection of the second inputs $Q_{20}$, $Q_{31}$, $Q_{42}$, $Q_{03}$ and $Q_{14}$ in multiplexers $5_0$ to $5_4$ to connect respectively outputs $Q_2$, $Q_3$, $Q_4$, $Q_0$ and $Q_1$ of counter 2 to outputs $P_0$ to $P_4$ of the multiplexers throughout the second multiframe period $t_1$ of the cycle. The selection of the third inputs $Q_{40}$, $Q_{01}$, $Q_{12}$, $Q_{23}$ and $Q_{34}$, of fourth inputs $Q_{10}$, $Q_{21}$, $Q_{32}$, $Q_{43}$ and $Q_{34}$ and of fifth inputs $Q_{30}$, $Q_{41}$, $Q_{02}$, $Q_{13}$ and $Q_{24}$ of multiplexers $5_0$ to $5_4$ take place in a similar way when the count of counter 4 is equal to 2, 3, and $4=N-1$, respectively for periods $t_2$, $t_3$ and $t_4=T_{N-1}$. The output address $P_4 P_3 P_2 P_1 P_0$ indicated in table I for each multiframe period corresponds to each address $Q_4 Q_3 Q_2 Q_1 Q_0$ outputting from counter 2.

Figure 6:
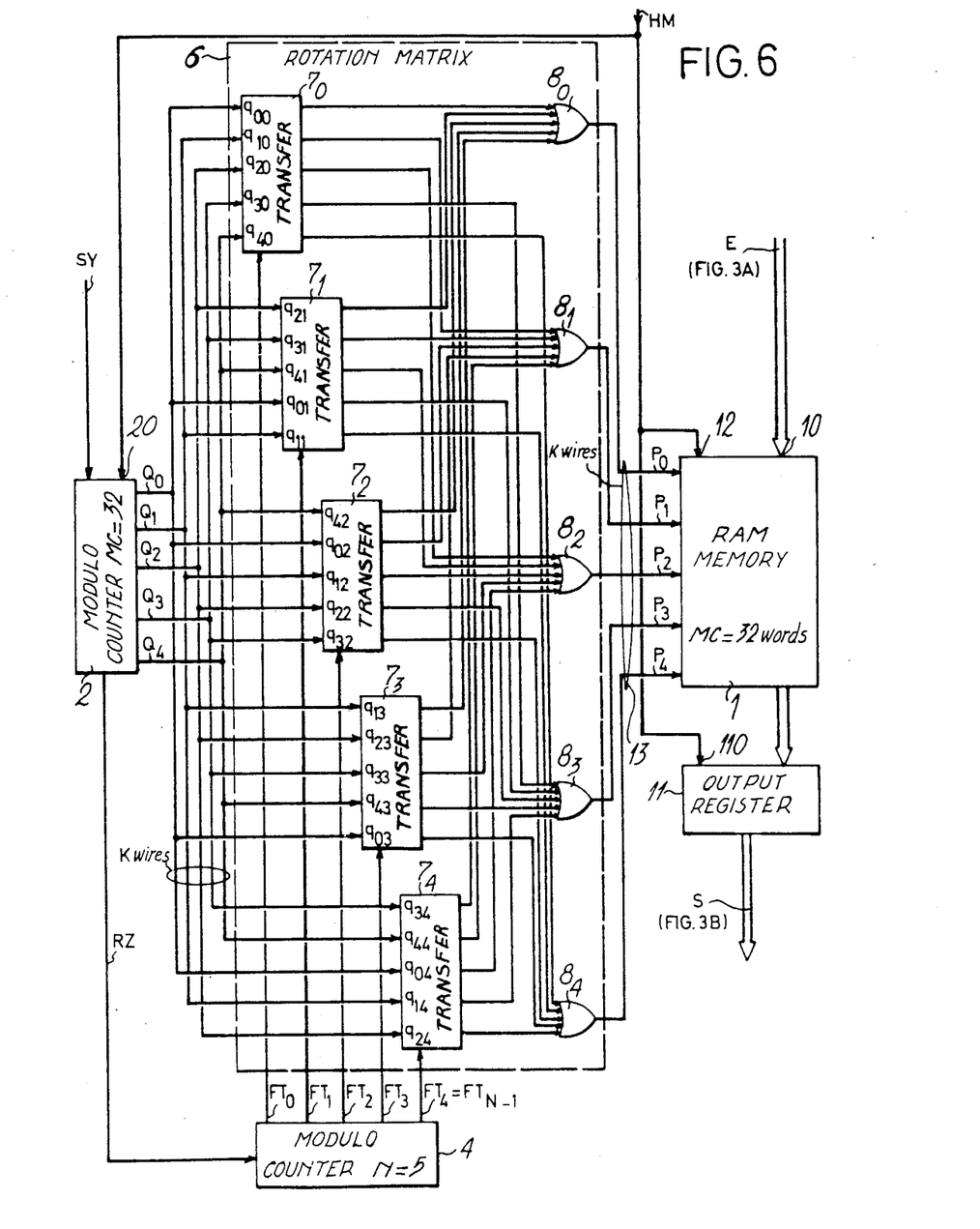
FIG. 6 is a block diagram of a second converting device according to the second embodiment.

According to another embodiment shown in FIG. 6, a rotation matrix 6 includes $N=5$ logic transfer gate circuits $7_0$ to $7_4=7_{N-1}$ connected in parallel. Each of the gate circuit has $K=5$ inputs, $K=5$ outputs and a control input. Each transfer circuit comprises $K=5$ two-input AND gates. The K inputs of each of the transfer circuits $7_0$ to $7_4$ are connected to the outputs of address counter 2 corresponding to a respective column in table I. Thus first to fifth inputs $q_{00}$, $q_{10}$, $q_{20}$, $q_{30}$ and $q_{40}$ of the first transfer circuit $7_0$ are connected to outputs $Q_0$ to $Q_4$ of counter 2 respectively. First to fifth inputs $q_{21}$, $q_{31}$, $q_{41}$, $q_{01}$ and $q_{11}$ of the second transfer circuit $7_1$ are connected to outputs $Q_0$ to $Q_4$ of counter 2 respectively. Connections from the inputs of the other transfer circuits $7_2$, $7_3$ and $7_4$ to the outputs of counter 2 are deduced in a similar way, corresponding to the third, fourth and fifth columns of bits in table I, as indicated in FIG. 6.

Thus, if the ranks of bits of successive numbers 0 to $(MC-1)=31$ in counter 2 applied respectively to the first, second, third and Kth inputs of any transfer circuit, such as inputs $q_{13}$, $q_{23}$, $q_{33}$, $q_{43}$ and $q_{03}$ of the nth=4th transfer circuit $7_3$, are denoted by $R_0$ to $R_{K-1}$, the bits of numbers 0 to $(MC-1)$ applied respectively to these inputs are then bit $Q_1$ having rank $R_0$ so that $0+(K-x)(n-1) \equiv R_0-1$ (mod K), i.e., $R_0=2$, bit $Q_2$ having rank $R_1$ so that $1+6 \equiv R_1-1$ (mod 5), i.e., $R_1=3$, bit $Q_3$ having rank $R_2$ so that $2+6 \equiv R_2-1$ (mod 5), i.e., $R_2=4$, bit $Q_4$ having rank $R_3$ so that $3+6 \equiv R_3-1$ (mod 5), i.e., $R_3=5$, and bit $Q_0$ having rank $R_4=R_{K-1}$ so that $(K-1)+(K-x)(n-1) \equiv R_1-1$ (mod K), i.e., $R_4=1$.

The first outputs of transfer circuits $7_0$ to $7_4$ connectable to the first inputs of these transfer circuits are connected through a $N=5$-input OR gate $8_0$ to a first wire $P_0$ of addressing bus 13 of memory 1. Likewise the second, third, fourth and fifth outputs of transfer circuits connectable respectively to the second, third, fourth and fifth inputs of these transfer circuits are connected respectively through N=5-input OR gates $8_1$, $8_2$, $8_3$ and $8_4$ to the second, third, fourth and fifth wires $P_1$, $P_2$, $P_3$ and $P_4$ of addressing bus 13.

According to this other embodiment, counter 4 has a bus with N wires $FT_0$ to $FT_4$ to select the transfer circuits $7_0$ to $7_4$. Wire $FT_0$ to $FT_4$ is connected to a control input common to K=5 AND gates in circuits $7_0$ to $7_4$. Thus, as soon as the count of counter 4 is equal to n−1, where n varies between 1 and N, the wire $FT_{n-1}$ is on state "1" and remains there throughout the nth multiframe period $t_{n-1}$ of a cycle of N multiframe periods so that the nth transfer circuit $7_{n-1}$ is the only conducting transfer circuit to connect the outputs of counter 2 to the addressing wires 13 of memory 1 according to the nth column of table I.

What we claim is:

1. A method for converting an inputting multiframe into an outgoing multiframe, said inputting multiframe having M frames, where M is an integer, each of said frames including words having a predetermined number of digits and assigned respectively to C time-division multiplexed digital channels, where C is an integer, said outgoing multiframe having C packets assigned respectively to said channels, each packet including M successive words of said respective channel, a word having a given rank and to be included in said outputting multiframe and a word having said given rank and included in said inputting multiframe being read and written consecutively in a same cell of a single memory, said memory having a capacity at least equal to MC word cells, and said MC cells of said memory being addressed according to an address order rebecoming identical to itself after a cycle of N multiframe periods, where N is the smallest integer so that $C^N \equiv 1$ (mod (MC−1)).

2. A method as claimed in claim 1, wherein said memory cells are successively addressed according to addresses 0, $a_1$ so that $C^{n-1} \equiv a_1$ (mod (MC−1)), $a_2$ so that $2C^{n-1} \equiv a_2$ (mod (MC−1)), $a_3$ so that $3C^{n-1} \equiv a_3$ (mod (MC−1)), ... $a_{(MC-1)}$ so that $(MC-1)C^{n-1} \equiv a_{(MC-1)}$ (mod (MC−1)), and (MC−1) during a nth multiframe period of said cycle, where n is an integer laying between 1 and N.

3. A method as claimed in claim 2, wherein said integer C is equal to $2^x$, where x is an integer, and wherein a memory cell address coded n binary code and having a given rank during a nth multiframe period of said cycle, where n is an integer laying between 1 and N, is deduced from a first memory cell address code in binary code and having said given rank during first multiframe period of said cycle, by shifting bits of said first address of x bit ranks as from a least significant bit rank of said first address.

4. A method as claimed in claim 1, wherein said integer C is equal to $2^x$, where x is an integer, and wherein a memory cell address coded in binary code and having a given rank during a nth multiframe period of said cycle, where n is an integer laying between 1 and N, is deduced from a first memory cell address code in binary code and having said given rank during first multiframe period of said cycle, by shifting bits of said first address of x bit ranks as from a least significant bit rank of said first address.

5. A device for converting inputting multiframes into outgoing multiframes, each of said inputting multiframe having M frames, where M is an integer, each of said frames including words having a predetermined number of digits and assigned respectively to C time-division multiplexed digital channels, where C is an integer, and each of said outgong multiframes having C packets assigned respectively to said channels, each of said packets including M successive words of said respective channel, said device comprising a memory receiving said inputting multiframes and transmitting said outgoing multiframes, said memory having at least MC words cells, means for counting said words in each of said inputting multiframes thereby successively supplying binary-coded numbers 0 to (MC−1) during each of multiframe periods, said binary-coded numbers 0 to (MC−1) forming a first address sequence of said memory cells for a first multiframe period of a multiframe cycle, said cycle having N multiframe periods, where N is the smallest integer so that $C^N \equiv 1$ (mod (MC−1)), and addressing means for converting said first sequence of said binary-coded numbers 0 to (MC−1) into N memory cell address sequences specific respectively to said multiframe periods of said cycle whereby a word having a given rank and to be included in one of said outgoing multiframes and a word having said given rank and included in one of said inputting multiframes are read and written consecutively in one and same cell of said memory.

6. A device for converting inputting multiframes into outgoing multiframes, each of said inputting multiframe having M frames, where M is an integer, each of said frames including words having a predetermined number of digits and assigned respectively to C time-division multiplexed digital channels, where C is an integer, and each of said outgoing multiframes having C packets assigned respectively to said channels, each of said packets including M successive words of said respective channel, said device comprising a memory receiving said inputting multiframes and transmitting said outgoing multiframes, said memory having at least MC words cells, a modulo-MC counter synchronized with and counting said words in said inputting multiframes for supplying binary-coded numbers 0 to (MC−1) during each of multiframe periods, said binary-coded numbers 0 to (MC−1) forming a first address sequence of said memory cells for a first multiframe period of a multiframe cycle, said cycle having N multiframe periods, where N is the smallest integer so that $C^N \equiv 1$ (mod (MC−1)), a modulo-N counter incremented responsive to resets of said modulo-MC counter for deriving signals respectively identifying said N multiframe periods of said cycle, and memory cell addressing means for deriving N memory cell address sequences in terms of said first address sequence and responsive to said N multiframe period identifying signals respectively, whereby a word having a given rank and to be included in one of said outgoing multiframes and a word having said given rank and included in one of said inputting multiframes are read and written consecutively in one and same cell of said memory.

7. The device claimed in claim 6, wherein said integer C is equal to $2^x$, where x is an integer, and said addressing means comprises K multiplexers controlled by said modulo-N counter, where K is an integer equal to a maximum number of bits in said memory cell addresses and to a maximum number of bits in said binary-coded numbers 0 to (MC−1),     each of said multiplexers having N inputs and one output delivering one bit having a given rank in each of said cell addresses,     said N inputs of a kth multiplexer, where k is an integer laying between 1 and K, being connected respectively to K outputs of said modulo-MC counter supplying the bits of said binary-coded numbers 0 to (MC−1) having respectively rank $R_0$ so that $R_0 = k$, rank $R_1$ so that $(k-1)+(K-x) \equiv R_1 - 1 \pmod{K}$, rank $R_2$ so that $(k-1)+(K-x)2 \equiv R_2 - 1 \pmod{K}$, ... and rank $R_{N-1}$ so that $(k-1)+(K-x)(N-1) \equiv R_{N-1} - 1 \pmod{K}$, said ranks being counted from 1 to K as from a least significant bit of said binary-coded numbers 0 to (MC−1), and     said outputs of said multiplexers being selectively connected to said inputs of said multiplexers receiving the respective bits of rank $R_{n-1}$ in responsive to said signal identifying a nth multiframe period of said cycle, where n is an integer laying between 1 and N.

8. The device claimed in claim 6, wherein said integer C is equal to $2^x$, where x is an integer and said addressing means comprises N transfer gate means controlled by said modulo-N counter,     each of said transfer gate means having K inputs and K outputs, where K is an integer equal to a maximum number of bits in said memory cell addresses and to a maximum number of bits in said binary-coded numbers 0 to (MC−1),     said K inputs of a nth transfer gate means being respectively connectable to K outputs of said modulo-MC counter supplying said bits of said binary-coded numbers 0 to (MC−1) having respectively rank $R_0$ so that $0 +_r (K-x)(n-1) \equiv R_0 - 1 \pmod{K}$, rank $R_1$ so that $1+(K-x)(n-1) \equiv R_1 - 1 \pmod{K}$, rank $R_2$ so that $2+(K-x)(n-1) \equiv R_2 - 1 \pmod{K}$, ... rank $R_{K-1}$ so that $(K-1)+(K-x)(n-1) \equiv R_{K-1} - 1 \pmod{K}$, where n is an integer laying between 1 and N, and     said inputs and said outputs of said nth transfer gate means being respectively connected to supply a sequence of MC addresses in response to the signal identifying a nth multiframe period of said cycle.

* * * * *